US011868819B2

(12) United States Patent
Pearce

(10) Patent No.: US 11,868,819 B2
(45) Date of Patent: Jan. 9, 2024

(54) SYSTEM AND METHOD FOR CONSTRUCTING FILTER GRAPH-BASED MEDIA PROCESSING PIPELINES IN A BROWSER

(71) Applicant: Grass Valley Limited, Newbury (GB)

(72) Inventor: James Edward Pearce, Newbury (GB)

(73) Assignee: GRASS VALLEY LIMITED, Newbury (GB)

(*) Notice: Subject to any disclaimer, the term of this patent is extended or adjusted under 35 U.S.C. 154(b) by 558 days.

(21) Appl. No.: 17/084,112

(22) Filed: Oct. 29, 2020

(65) Prior Publication Data

US 2021/0182123 A1 Jun. 17, 2021

Related U.S. Application Data

(60) Provisional application No. 62/943,058, filed on Dec. 3, 2019, provisional application No. 62/929,600, filed on Nov. 1, 2019.

(51) Int. Cl.
*G06F 9/52* (2006.01)
*G06F 9/54* (2006.01)
*G06F 16/25* (2019.01)
*G06F 16/957* (2019.01)

(52) U.S. Cl.
CPC ............... *G06F 9/52* (2013.01); *G06F 9/546* (2013.01); *G06F 9/547* (2013.01); *G06F 16/258* (2019.01); *G06F 16/957* (2019.01)

(58) Field of Classification Search
CPC ........ G06F 9/52; G06F 16/957; G06F 16/258; G06F 9/546; G06F 9/547
See application file for complete search history.

(56) References Cited

U.S. PATENT DOCUMENTS 8,751,565 B1 6/2014 Jia
2002/0105529 A1* 8/2002 Bowser ............... H04N 21/4725
348/E7.071
2002/0116708 A1 8/2002 Morris et al.
(Continued)

OTHER PUBLICATIONS

International Search Report for PCT/GB2020/052749, dated Feb. 16, 2021, 3 pages.

*Primary Examiner* — Emerson C Puente
*Assistant Examiner* — Jonathan R Labud
(74) *Attorney, Agent, or Firm* — ARENTFOX SCHIFF LLP

(57) ABSTRACT

A system and method is provided for constructing filter graph-based media processing pipelines to render media content. The system includes a web browser running on a client device and for rendering media content, and a main application thread executed by a processor of the client device, The main application thread determines a processing function of media data received by the web browser; constructs a filter graph directly in the web browser that includes filters instantiated as web workers and for executing respective functions for the processing function of the media data; assesses a compatibility between the filters; and connects the filters via message channels upon compatibility. Moreover, one filter transmits media to a second filter after performing the respective function in which the second filter the enters the transmitted media in a queue and renders media content in the browser based on the queued media.

20 Claims, 7 Drawing Sheets

(56) References Cited

U.S. PATENT DOCUMENTS

2011/0138069 A1\* 6/2011 Momchilov .......... H04L 65/765
                                                    709/231
2013/0166767 A1\* 6/2013 Olivier ............... H04N 21/2143
                                                    709/231

\* cited by examiner

SYSTEM AND METHOD FOR CONSTRUCTING FILTER GRAPH-BASED MEDIA PROCESSING PIPELINES IN A BROWSER

CROSS REFERENCE TO RELATED APPLICATIONS

This application claims priority to U.S. Provisional Application No. 62/929,600, filed Nov. 1, 2019, and to U.S. Provisional Application No. 62/943,058, filed Dec. 3, 2019, the contents of each of which are hereby incorporated by reference in their entireties.

TECHNICAL FIELD

The present disclosure generally relates to media processing in a browser, and, more particularly, to a system and method for constructing filter graph-based media processing pipelines in a browser.

BACKGROUND

Modern browsers offer a number of APIs (application programming interfaces) for accessing and manipulating media. However, these APIs are targeted at consumption rather than creation. They are designed to aid with the delivery of media to end-consumers using a form that can be readily rendered on domestic client devices. In general, APIs do not cater well to media creation use cases. For example, when relying on a browser's playback capabilities, seeking and cueing to specific positions in media may not be frame-accurate. Audio is typically restricted to a small handful of channels rather than the multitude required by creative professionals. These shortcomings require rethinking the mechanism for rendering in-browser media altogether. Over the years, a number of strategies have been developed to overcome these limitations, with varying success.

One approach is to simply extend or replace the APIs by developing (e.g., via JavaScript) engines directly in the browser. This is very difficult to achieve, however, because JavaScript is interpreted, and typically does not provide the performance required for decoding modern video formats. The problem is amplified when multiple channels or audio/video are combined and demand further processing. Even if JavaScript did meet performance requirements, by default, JavaScript shares a thread with the user interface. As a result, attempting to perform CPU-intensive activities has a tendency to make the application freeze.

Another approach is to utilize a filter graph, which is a directed graph containing one or more filters. Filters are typically connected to each other via "pins" or "pads" such that data can be delivered from one filter to another via those connections. The filters themselves usually perform some simple transformation on incoming data before delivering it "downstream." Graphs start with source filters, which have no input pins, and end with sink filters, which have no output pins. Respective examples may include a File Reader filter and a Video Render filter.

A number of existing filter graph implementations exist. However, these are written in native code and take advantage of programming language and performance features unavailable to a browser. They typically have complex threading models and memory management requirements.

SUMMARY

In recent years, features have been introduced to mitigate some of the restrictions mentioned above. For example, the open standard "WebAssembly" defines a portable binary code format for executable programs and enables code to run closer to native speed. In addition, web workers have been introduced allowing work to be dispatched to separate JavaScript contexts and the MessageChannel interface allows web workers to communicate directly with each other.

The present disclosure addresses the technical limitations of a browser when processing media by defining a filter graph implementation that maps directly onto web workers, MessageChannels, WebAssembly, and worker-to-worker message passing. By modeling each filter as a web worker, with code written in either WebAssembly or JavaScript, and by modeling filter-to-filter data transfer via MessageChannels, a filter graph can be developed directly in the browser—thus gaining the benefits of extensibility and componentization, without introducing significant performance problems. Moreover, the benefit using a filter graph developed directly in a web browser is that processing of the media data (e.g., video and/or audio data) is divided into smaller, self-contained functional units (i.e., each individual filter). As a result, the constructed filter graph implementation can meet arbitrarily complex media processing requirements by composing these units in the appropriate way. Moreover, additional functionality can easily and dynamically be added by inserting a new filter into the constructed filter graph.

Thus, in an exemplary embodiment, a system is provided for constructing filter graph-based media processing pipelines directly in a browser. These pipelines can be configured for decoding, transcoding, or otherwise transforming the incoming media content (e.g., media essence). In an exemplary aspect, the system includes a media processing functionality determination module (or "media processing functionality determiner") configured to determine a processing function of media data received by a web browser; and a main application thread configured to construct a filter graph directly in the web browser that includes a connected upstream filter and a renderer filter, each configured to perform a respective function for executing the processing function of the media data. Moreover, the main application thread is configured to instantiate the upstream filter and the renderer filter of the filter graph as JavaScripts configured as web workers configured to perform the respective functions; assess compatibility between the upstream filter and the renderer filter; and connect the upstream filter and the renderer filter via a MessageChannel if the main application thread determines that the upstream filter is compatible with the renderer filter. According to the exemplary aspect, the upstream filter is configured to process and transmit, via the MessageChannel, media samples to the renderer filter, wherein the media samples include timestamps. Moreover, the renderer filter can be configured to enter the media samples in a queue and render media in the browser based on the media samples and the timestamps.

In another exemplary aspect, the processing function of media data is for converting the media data from a first format to a second format that can be rendered by the web browser.

In yet another exemplary aspect, the media processing functionality determiner is configured to determine that the media data is received in the first format that the web browser is not configured to render and determine the second format for the media data that can be rendered by the web browser.

In yet another exemplary aspect, the respective web workers are configured to be executed independently from the main application thread.

In yet another exemplary aspect, the main application thread is configured to execute the media processing functionality determiner to determine the processing function of media data and to instantiate the upstream filter and the renderer filter of the filter graph based on the determined processing function.

In yet another exemplary aspect, the main application thread is configured to assess the compatibility between the upstream filter and the renderer filter based on input and output pins of the respective filters and the configurations of the pins for communicating data based on at least one of a data type and a data format of the communicated data between the respective filters.

In another exemplary embodiment, a system is provided for constructing filter graph-based media processing pipelines directly in a web browser. In this aspect, the system includes a media processing functionality determiner configured to determine a processing function of media data received by a web browser; and a main application thread configured to construct a filter graph directly in the web browser that includes a first filter and a second filter that are each configured to execute a respective function for the processing function of the media data. Moreover, the main application thread is configured to instantiate the first and second filters of the filter graph as web workers for performing the respective functions; assess a compatibility between the first and second filters; and connect the first filter and the second filter via a message channel if the main application thread determines that the respective filters are compatible with each other. In addition, the first filter is configured to process and transmit media to the second filter; and the second filter is configured to enter the media in a queue and render media content in the browser based on the queued media. Moreover, in a refinement of this aspect, the first filter comprises a connected upstream filter and the second filter comprises a renderer filter that is configured to render the media content in the browser based on timestamps of the queued media.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

DETAILED DESCRIPTION

Figure 1A:
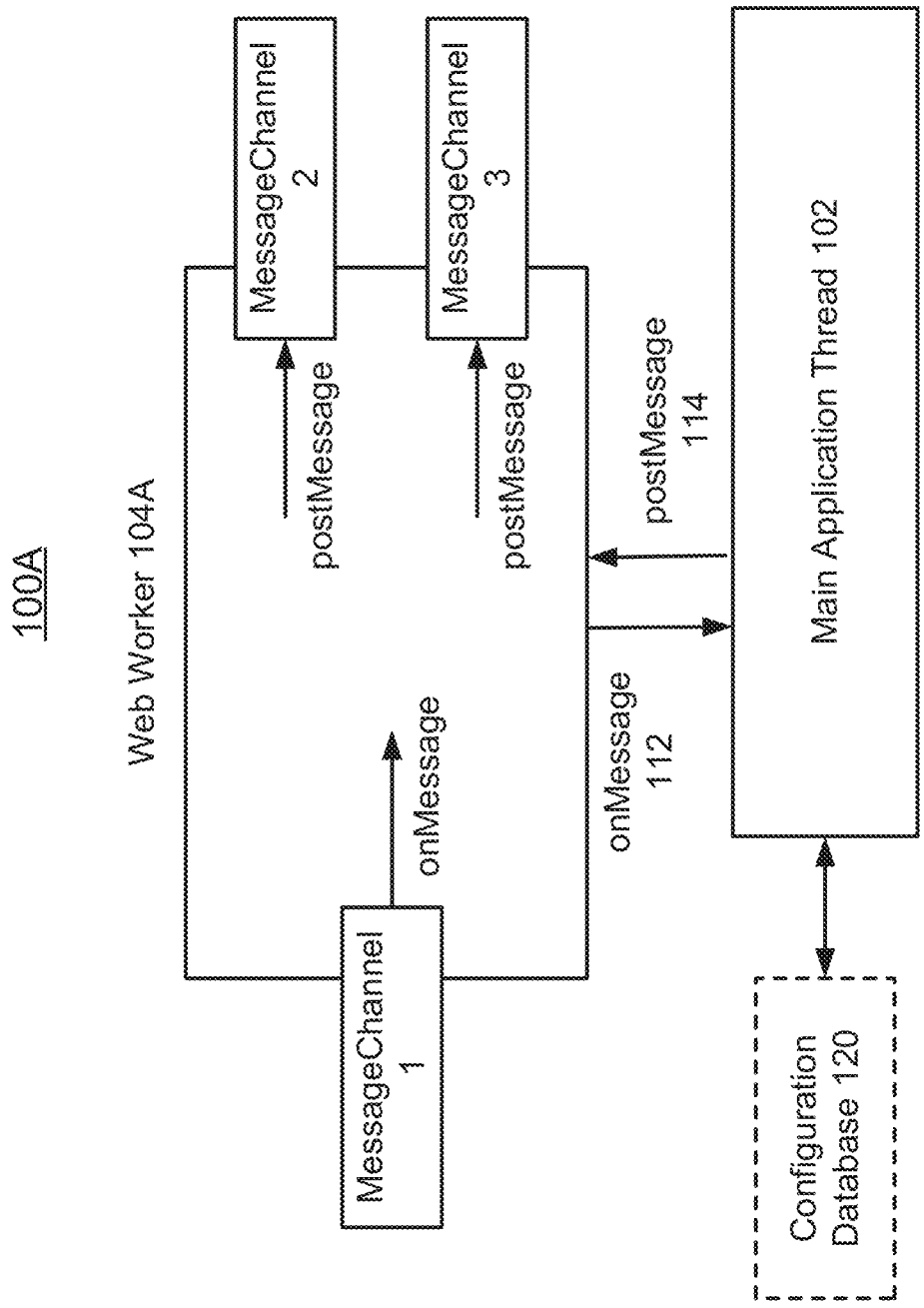
FIG. 1A is a block diagram of a system for performing in-browser media processing using a web worker according to an example embodiment.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

FIG. 1A is a block diagram of system 100A for performing in-browser media processing using a web worker, according to an example embodiment. As shown, system 100A comprises main application thread 102 and web worker 104A. Main application thread 102 may be a main JavaScript thread where a browser (e.g., a web browser executing on a client device) processes user events. A web worker 104A, as defined by the World Wide Web Consortium (W3C), for example, is a JavaScript script that is instantiated by another JavaScript script (e.g., main application thread 102) and runs independently from the launching script (i.e., the main application thread 102). In general, web workers 104A can be configured to execute long-running or computationally intensive tasks without blocking the main user interface thread that can be run in parallel. Moreover, all current web browsers are generally configured to support web workers.

According to an exemplary aspect, main application thread 102 and web worker 104A are configured to communicate via message passing. According to an exemplary aspect, one or more functions can be configured to receive and messages between main application thread 102 and the one or more web workers 104A. For example, these functions are provided as onMessage 112 and postMessage 114 and can be figured to receive and send messages back and forth in an asynchronous manner as JavaScript objects in an exemplary aspect. Receipt of a message triggers an event that can be handled via an event handler when the script of the web worker 104A is otherwise idle, for example. Moreover, if the script is busy, the message will sit in a queue until the script is free to process the message. According to an exemplary aspect, exchanging messages between web worker 104A and main application thread 102 is provided for control and construction of the filter graph. For example, main application thread 102 can be configured to send web worker 104 a message for either initializing web worker 104A, disposing web worker 104A, or assigning a Message Port to allow web worker 104A to communicate directly with other web workers. In some aspects, web worker 104A can also be configured to process data for a period of time, and then return a processing result to main application thread 102 as a JavaScript object via messaging function onMessage 112.

In an exemplary aspect, the web workers 104A are configured to communicate messages between each other and/or the main application thread 102 using onMessage 112 and postMessage 114 functions as described above. In this aspect, web workers 104A reside in the same process as each other and the main application thread 102.

In a refinement of the exemplary aspect, the browser-based code for each web worker can be configured to communicate data messages between to a remote machine using a Web Socket. Web Socket provides full-duplex communication and enables streams of messages on top of TCP as would be appreciated to one skilled in the art. By using one or more WebSockets for communication of messages in an exemplary aspect, this configuration would allow construction of a filter graph where the source samples of the media content are received from a server (e.g., video server), for example According to an exemplary aspect, web worker 104A may also communicate with another web worker via a MessageChannel (e.g., MessageChannel 2 and/or MessageChannel 3), which provides the same message passing functionality as with main application thread 102, for example. In an exemplary aspect, each MessageChannel can be configured as a bi-directional pipe through which messages can be posted. Main application thread 102 can be configured to create a MessageChannel between two web workers and the channel's "ports" (e.g., either end) are then posted (via message) to the two web workers to establish a link between them. For example, MessageChannel 1 may connect web worker 104A to a first web worker, MessageChannel 2 may connect web worker 104A to a second web worker, MessageChannel 3 may connect web worker 104A to a third web worker and so forth. For simplicity, only three MessageChannels are depicted in FIG. 1. However, one skilled in the art would appreciated that web worker 104A can accommodate any number of MessageChannels to construct the filter graph in the web browser according to exemplary aspects.

According to an exemplary aspect, messages can be configured or constructed to carry media buffer data to be processed by a filter and/or carry control information (e.g., configuration and set up data). Messages may arrive from other filters, or from main application thread 102. A message may comprise a name, which is a string that describes the purpose of the message. Examples of names may include "connectpin" or "media." In some aspects, a message may additionally comprise a payload, which varies depending on the purpose of the message. For example, a payload may be a video bit-stream (e.g., video frame, IP data packets or datagrams or the like). In some aspects, a message may additionally comprise a sequence ID. The sequence ID may be used to facilitate replies, such that a reply to a message with a sequence ID will carry the same sequence ID, allowing a message sender to await a valid response.

In some aspects, message passing allows the non-copy transfer of payloads from one thread to another. This is an important performance factor when dealing with large buffers of data. In particular, when processing media data, the buffers involved can be quite large where, for example, an uncompressed 1920×1080 video frame might consume 4 MB of memory. As a result, resource consumption would be expensive if the system had to copy this data every time it was required to be transferred from one filter to another during operation. Instead, in implementation, the buffer can be transferred so not copying is performed. Instead, only the reference to that buffer is copied from one filter to the next filter in the filter graph. Thus, in implementation, once one web worker 104A is finished with a buffer, the web worker can "transfer" the buffer (e.g., a reference to the buffer) via a message to another thread/worker. Once transferred, the sending web worker no longer has access to the buffer and the receiving web worker can access the buffer (via the transferred reference) at that time. Advantageously, this configuration prevents superfluous data (e.g., unused copies) from slowing the system down.

In a variation of the exemplary embodiment, web workers can also be directed to run WebAssembly instead of JavaScript. WebAssembly is a binary code format compiled from programming languages such as C or C++. Typically, WebAssembly code performs closer to native applications than JavaScript, which makes WebAssembly an ideal target for CPU intensive activities such as media decoding.

Figure 2:
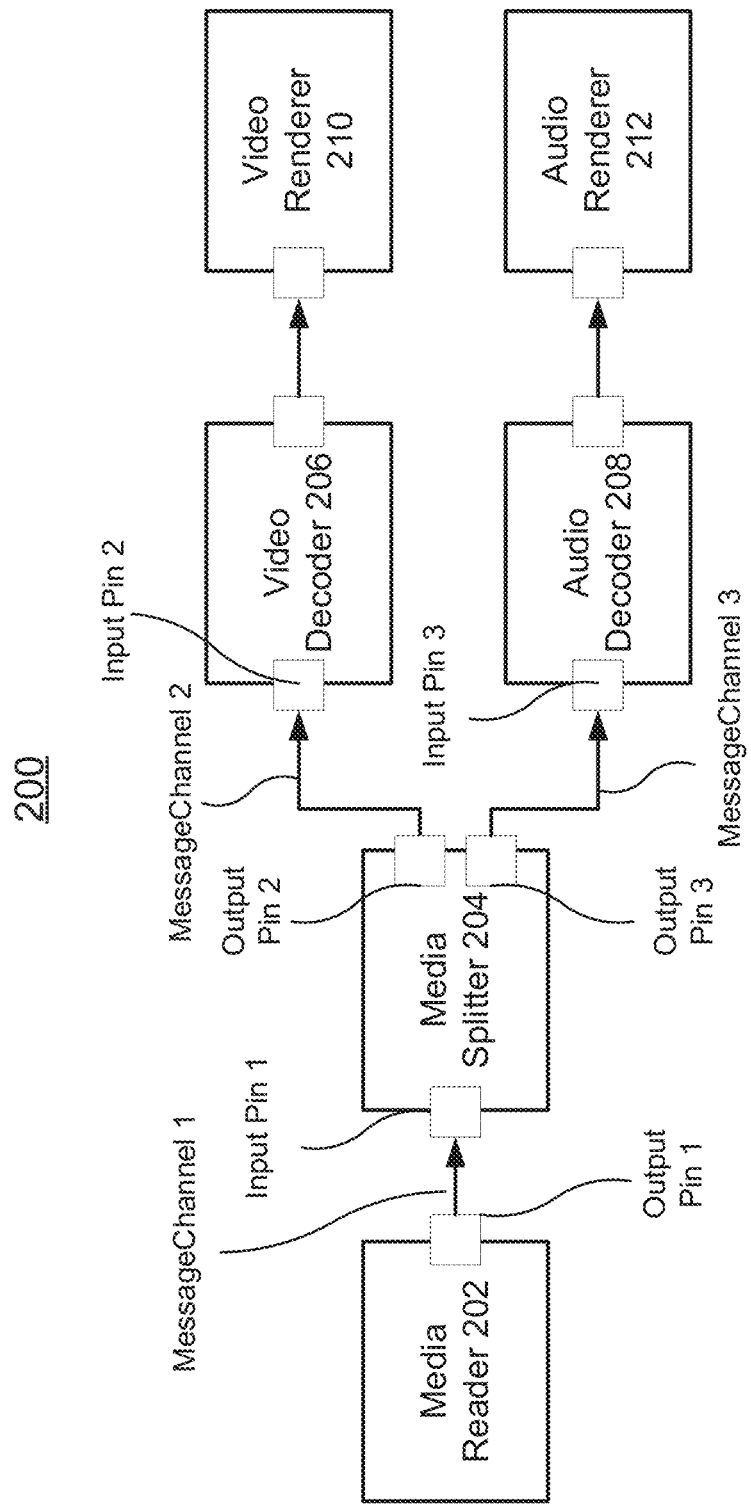
FIG. 2 is a block diagram of a system comprising a filter graph implemented using web workers according to an example embodiment.

FIG. 2 is a block diagram of system 200 comprising a filter graph implemented using web workers, according to an example embodiment. System 200 depicts a filter graph that comprises a plurality of filters including: a Media Reader 202 configured to identify and analyze input media (e.g., video and audio content) that is to be rendered, a Media Splitter 204 configured to split the media into various channels (e.g., video and audio), a Video Decoder 206 and an Audio Decoder 208 configured to convert the output of the Media Splitter 204 into video and audio signals respectively, and a Video Renderer 210 and an Audio Renderer 212 configured to, in combination, generate the final output of the media (e.g., media content) on a browser of a content consuming device (e.g., client device).

According to an exemplary aspect, main application thread 102 can be configured to determine which filters to retrieve and/or add for the plurality of filters to be used in the pipeline based on the type of media processing that needs to be performed. In other words, the main application thread 102 can be configured (e.g., programmed with code) as a media processing functionality determination module that is configured to determine a processing function of media data received by a web browser. That is, the main application thread is configured to execute the media processing functionality determiner to determine the processing function of media data (e.g., determine that the incoming media requires decoding and/or conversion) and to instantiate the respective filters of the filter graph based on the determined processing function that are needed to perform achieve this function.

In general, it is noted that the main application thread 102 can determine which filters to retrieve and/or add for the plurality of filters on an application specific basis since different applications will have different requirements. For example, an application may have a set of "predetermined" configurations and parameters of constructing a graph depending on the format of the source media. That is, the main application thread 102 may be configured to identify parameter settings for the application that are each associated with a specific media type source. For example, if the data source is MP4, the main application thread 102 can be configured to access such configuration and parameter settings predetermined for MP4. As a result, the system can determine to construct the filter graph in a particular way in order to render that type of media content.

For more complex applications, the main application thread 102 can be communicatively coupled to a database (e.g., configuration database 120 as shown in FIG. 1) to access such parameters and settings. It is noted that configuration database 120 is shown in dashed lines to indicate it is an option component according to an exemplary aspect. In this exemplary aspect, a multitude of filter graph configurations can be stored in a database and the main application thread 102 can be configured to access and lookup the correct configuration based on the particular processing requirements for the function. Moreover, this embodiment could even be extensible to allow additional processing graphs to be defined. The database can be constructed to allow the application to look up a configuration based on input and output requirements.

Yet further, for even more complex applications, an exemplary system can be provided utilizing a dynamic approach in which only the start and end filters are defined. In this case, the main application thread 102 can be further configured to enumerate a known set of filters to find a chain of them that connect together with mutually acceptable formats. It should be appreciate that this configuration can be implemented using the filter pins described herein that advertise the formats they each support. Using this information, the filters can be configured to negotiate a mutually acceptable format for the overall filter graph and to implement the media processing functions.

In an exemplary aspect, the main application thread 102 may determine that H.264 media needs to be rendered from an HTTP source and, therefore, may construct the filters depicted in system 200 to prepare the pipeline for rendering the media content. Thus, as described above, it should be appreciated that if main application thread 102 were to process a different type of media or perform a different type of processing, main application thread 102 can be configured to generate a different plurality of filters that the exemplary pipeline shown in system 200. In other words, main application thread 102 can be preconfigured to identify a required function based on received media and then construct the required filters to build the filter graph pipeline in the web browser, as described herein, to perform the required processing accordingly. It also should be appreciated that the media processing functionality determination module can be configured as a separate software component in an alternative embodiment that is communicatively coupled to the main application thread 102 and configured to confirm to the main application thread 102 the required functionality for the filter graph pipeline in the web browser.

In general, the term "module" as used herein can refer to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

Moreover, in an exemplary aspect, the renderers are configured to fetch data from the Media Splitter 204 and can also be driven by a system or reference clock. For example, the Media Splitter 204 may split a program stream (e.g., MP4) into individual elementary streams (e.g., H.264 video, AAC audio and the like). The decoders 206 and 208 can be configured to convert these streams into a presentable form (e.g., buffers of YUV and PCM data). For timing, an accurate clock is required. For example, web browsers provide an Audio API that has an accurate clock that measures time since the audio context is started. The time is measured in seconds, but is accurate to multiple decimal places. An event called an animation timer is fired whenever the browser wants to render a frame. Every time that an event is fired, main application thread 102 looks at the current state of the clock, and determines which, if any, samples should be rendered.

According to an exemplary embodiment, each filter (e.g., filters 202, 204, 206, 208, 201 and 212) can be executed as a web worker (e.g., a web worker 104A as described above) that can be utilized to perform an associated function for media processing as part of the constructed filter graph in the web browser. For example, the Media Splitter 204 can correspond to web worker 104A from system 100A in an exemplary aspect that is communicatively coupled to main application thread 102. The MessageChannels 1, 2, and 3 connect web worker 104A with the web workers executing the Media Reader 202, Video Decoder 206, and Audio Decoder 208, respectively. Being executed as a web worker enables a filter to be isolated from the rest of system 200, and run independently of the main application thread 102 as described in an exemplary aspect, thereby preventing a potential freeze of the application. When not processing messages, the filter may remain idle.

In one example, the Video Decoder 206 may be a H.264 decoder that receives a compressed H.264 bit-stream from the Media Splitter 204 (e.g., a MP4 demuxer), decodes the syntax, and extracts information from the bit-stream to reverse encoding and recreate a sequence of video images. In one example, the Audio Decoder 208 may be an Advanced Audio Coding (AAC) decoder that receives an audio bit-stream from the Media Splitter 204, decodes the syntax, and extracts information from the bit-stream to reverse encoding and recreate the audio.

In another example, main application thread 102 can be configured to implement a filter in JavaScript and/or WebAssembly, depending on the filter's performance requirements. For example, a H.264 decoder may be associated with a first set of performance requirements that are met by WebAssembly, and a HTTP source filter may be associated with a second set of performance requirements that are met by JavaScript. Accordingly, the H.264 decoder may be written in WebAssembly and the HTTP source filter may be written in JavaScript. In some aspects, renderers such as the Video Renderer 210 and the Audio Renderer 212 may be implemented on main application thread 102, rather than as separate web workers.

Each filter (e.g., filters 202, 204, 206, 208, 201 and 212), which can be implemented as a web worker in the web browser environment, has a set of logical pins including at least one output pin and at least one input pin. An output pin (e.g., output pin 1, output pin 2) transmits data and an input put (e.g., input pin 1, input pin 2) receives data. Preferably the pins are not shared or split; thus, one output pin is connected to one input pin. For example, output pin 1 is connected solely to input pin 1. Moreover, each pin has an ID (e.g., "1", "2", etc.) a direction (e.g., input, output), and data that describes the form of media the pin is configured to receive or transmit. This data can be used by main application thread 102 to determine whether two pins are compatible, before any attempt is made to connect the pins. For example, output pin 1 may output a H.264 bit-stream and input pin 1 may accept H.264 bit-streams. Because of the corresponding input/output (IO) file types, main application thread 102 can be configured to determine that output pin 1 is compatible with input pin 1 since they are configured to communicate date having corresponding file types.

In some aspects, pins are connected via a JavaScript MessageChannel. As mentioned previously, the Media Splitter 204 may be web worker 104A. To further depict this correspondence, MessageChannel 1, 2, and 3 are shown in both FIG. 1 and FIG. 2. As depicted, MessageChannel 1 connects output pin 1 and input pin 1, while MessageChannel 2 connects output pin 2 and input pin 2 and MessageChannel 3 connects output pin 3 and input pin 3. Connected pins are assigned a MessagePort, which is one end of a MessageChannel. Each filter has message event handlers that are called when the filter receives a message. In particular, input pins register the message event handlers to receive and process messages on their MessagePort. On the other hand, output pins post messages via their MessagePort.

In some aspects, the number of pins available on a filter may vary. For example, an incoming stream for a filter (e.g., the Media Splitter 204) may comprise three channels. The filter itself may only have two output pins at a given time, for example. From the perspective of the filter, because the number of channels of the incoming stream is unknown until the filter begins receiving data, the state of the filter needs to dynamically be adjusted to include three output pins. The filter can be configured to send a message to the main thread (e.g., main application thread 102) indicating that the pin configuration has changed. In one exemplary aspect, the main application thread 102 can also be configured to query each filter for information about the additional pins, and to determine a connection scheme for the plurality of filters based on a query result provided by each queried filter that indicates its particular pin configuration of input and output pins.

Figure 1B:
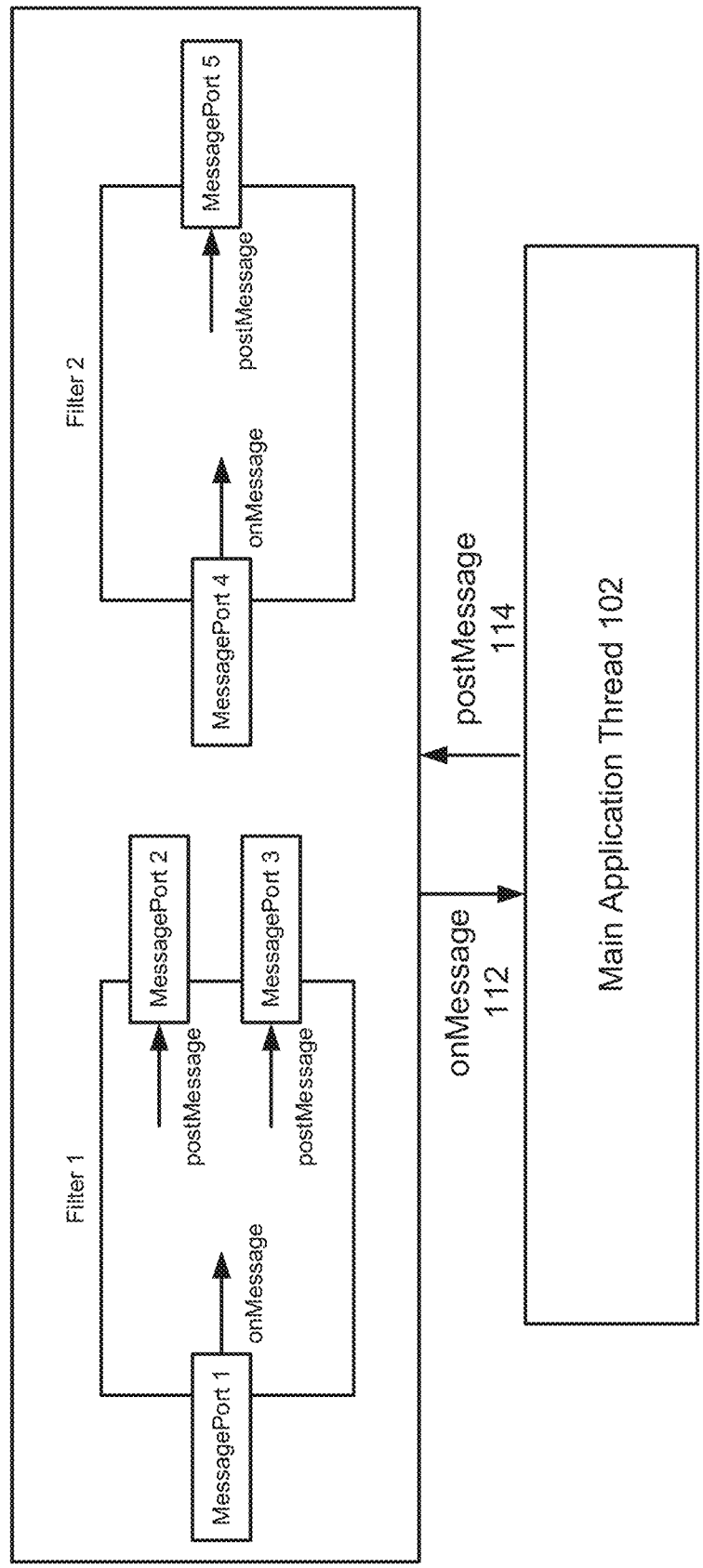
FIG. 1B is a block diagram of a system for performing in-browser media processing using a web worker comprising multiple filters according to an example embodiment.

FIG. 1B is a block diagram of system 100B for performing in-browser media processing using a web worker comprising multiple filters according to an example embodiment. As described above, the first exemplary embodiment of the present disclosure (e.g., system 100A) utilizes individual web workers for providing singular filters. More specifically, a media processing filter is implemented in a web worker and communication with other filters (in other web workers) occurs via MessageChannels. In a variation of the exemplary embodiment, a given web worker can be configured to implement a plurality of filters.

More specifically as shown in FIG. 1B, a system 100B is provided that includes a web worker 104B that houses filter 1 and filter 2. It should be noted that web worker 104B may house any number of filters and only two are depicted in FIG. 1B for simplicity. In some cases, media processing filters are trivial and do not require significant processing time. Rather than needlessly expending processing and memory resources to host such filters in their own respective web worker, more than one filter can be placed in a web worker. For example, referring to FIG. 2, audio decoder 208 may comprise a plurality of signal processing filters (e.g., filter 1 and filter 2), all housed in web worker 104B. The filters work as they are configured to, without being aware of whether the filters are being hosted in the main thread, in a dedicated worker thread, or in a shared worker thread.

Each filter in the plurality of filters is configured and controlled by main application thread 102 via messages passed to the hosting web worker 104B. In this exemplary embodiment, the plurality of filters are configured to receive and pass samples downstream from/to one another via MessageChannels in the same way as they would across multiple web workers. The functionality of a MessageChannel remains the same irrespective to whether both endpoints are in the same web worker or in different web workers. As depicted in FIG. 1B, filter 1 has one input MessagePort (1) and two output MessagePorts (2 and 3), while filter 2 has one input MessagePort (4) and one output MessagePort (5).

In FIG. 2, the web workers are shown to be arranged in a sequential manner. However, in some embodiments, the web workers may not execute sequentially. For example, consider a scenario in which a first web worker houses filter 1 and filter 2 and a second web worker houses arbitrary filters 3 and 4. In an exemplary aspect, filter 1 of the first web worker may pass samples to filter 4 of the second web worker. Subsequent to processing the samples at filter 4, the second web worker may pass samples to filter 3. Subsequent to processing the received samples at filter 3, the second web worker may pass the samples processed at filter 3 to filter 2 of the first web worker.

Figure 3:
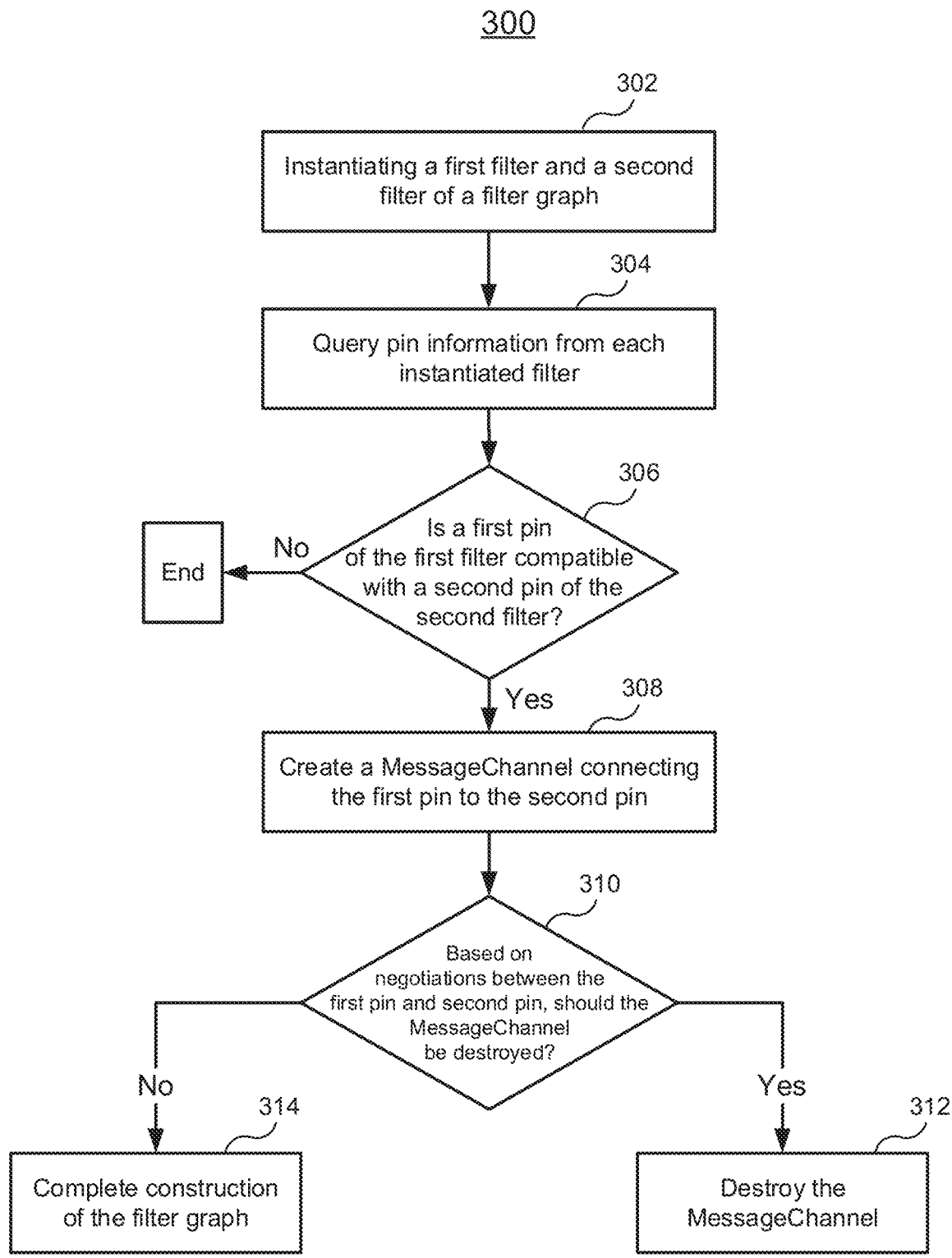
FIG. 3 illustrates a flowchart of a method for constructing a filter graph for in-browser media processing using web workers according to an example embodiment.

FIG. 3 illustrates a flowchart of method 300 for constructing a filter graph for in-browser media processing using web workers according to an example embodiment. It is noted that the method 300 can be implemented using the system 100A of FIG. 1A (and/or the system 100B of FIG. 1B) to construct the system 200 comprising the filter graph as shown in FIG. 2, according to an exemplary aspect.

Moreover, it should appreciated that the main application thread 102 can be configured to construct a filter graph-based media processing pipeline directly in the web browser running, for example, on a client device, as described according to the following method. As an example, the web browser may receive a media file in a specific format (e.g., P2 storage media format) in which the web browser is not currently configured to read and display the specific format of the P2 media content. According to the exemplary aspect, the main application thread 102 is configured to detect this incompatibility and instantiate the required filters to construct a filter graph-based media processing pipeline to decode the otherwise unreadable media format and convert it to a format readable by the web browser. As described above, web workers can be implemented to form the filters that execute the required functions for decoding the P2 media format. In another exemplary aspect, a user interface can be provided to initiate construction of the filter graph-based media processing pipeline to add the decoding functionality as needed for the web browser to display the media content therein.

Thus, according to the example shown in FIG. 3, method 300 starts at 302, where main application thread 102 instantiates a first filter and a second filter of a filter graph configured for media processing (e.g., playing a video file in a browser). By instantiating the first filter and the second filter, main application thread 102 also launches a corresponding web worker for each respective filter. Upon instantiation, the filters are idle, have no connections to other filters or each other, and solely communicate with main application thread 102. It is noted that while only first and second filters are described according to the algorithm shown in FIG. 3, additional filters may be dynamically added for constructing the filter graph depending on the number of functions required to process the incoming media content.

At 304, main application thread 102 communicates with each filter to query pin configuration information. In some aspects, main application thread 102 may communicate with each filter to apply (e.g., configure or set) a pin configuration. In response to querying pin information from each filter, main application thread 102 may receive a first configuration message from the first filter and a second configuration message from the second filter. Each configuration message may comprise details about the pin configurations associated with the respective filter such as: the pin ID for each pin, a direction of the respective pin, and the type of data that the respective pin is configured to process.

At 306, main application thread 102 determines, based on the configuration messages, whether a first pin of the first filter is compatible with a second pin of the second filter (e.g., whether the two pins are configured to communicate the same data type and/or format). In response to determining that the pins are not compatible, main application thread 102 may compare other pins of the respective filters to check for compatibility. If none of the pins are compatible, method 300 ends (i.e., a filter graph is not constructed).

If at 306, main application thread 102 determines that the first pin and the second pin are compatible, method 300 proceeds to 308, where main application thread 102 attempts to connect the respective pins by creating a MessageChannel between the two filters. The ends of the MessageChannel (i.e., the MessagePorts) are posted to the corresponding filters as part of a message payload, along with the pin IDs to be connected.

Once two pins are initially "connected" (i.e., MessagePorts have been received by both ends, and event handlers are ready to receive), the filters will "negotiate" between themselves to determine if the pins can transfer data in an acceptable format. The negotiating takes the form of messages sent back and forth along the MessageChannel. Accordingly, at 310, main application thread 102 determines whether the MessageChannel should be destroyed based on the negotiations.

If the negotiation fails, main application thread 102 is informed, and method 300 ends at 312, where main application thread 102 destroys the MessageChannel. If the negotiations succeed, the MessageChannel does not need to be destroyed; method 300 then ends at 314, where main application thread 102 completes construction of the filter graph that includes the coupling of the respective filters to one another to perform the respective functions for processing the media content. In some aspects, at 314, main application thread 102 may attempt connecting the first filter and second filter with a third filter. In this case, main application thread 102 will instantiate the third filter, query the third filter for pin information, assess the compatibility of a pin of the third filter with an unconnected pin of the first and second filters, and create another MessageChannel. It is noted that the instantiating of the third filter can be performed in sequence or parallel.

In response to creating the other MessageChannel, main application thread 102 monitors for messages indicating whether negotiations between the third filter and either the first or second filter were successful. Based on the success of the negotiations, main application thread 102 may confirm the addition of the third filter into the filter graph or may delete the other MessageChannel. When a filter graph is fully connected and stable, the filter graph can begin processing data (e.g., reformatting the media content to be displayed on the browser according to an exemplary aspect as described herein).

Figure 4:
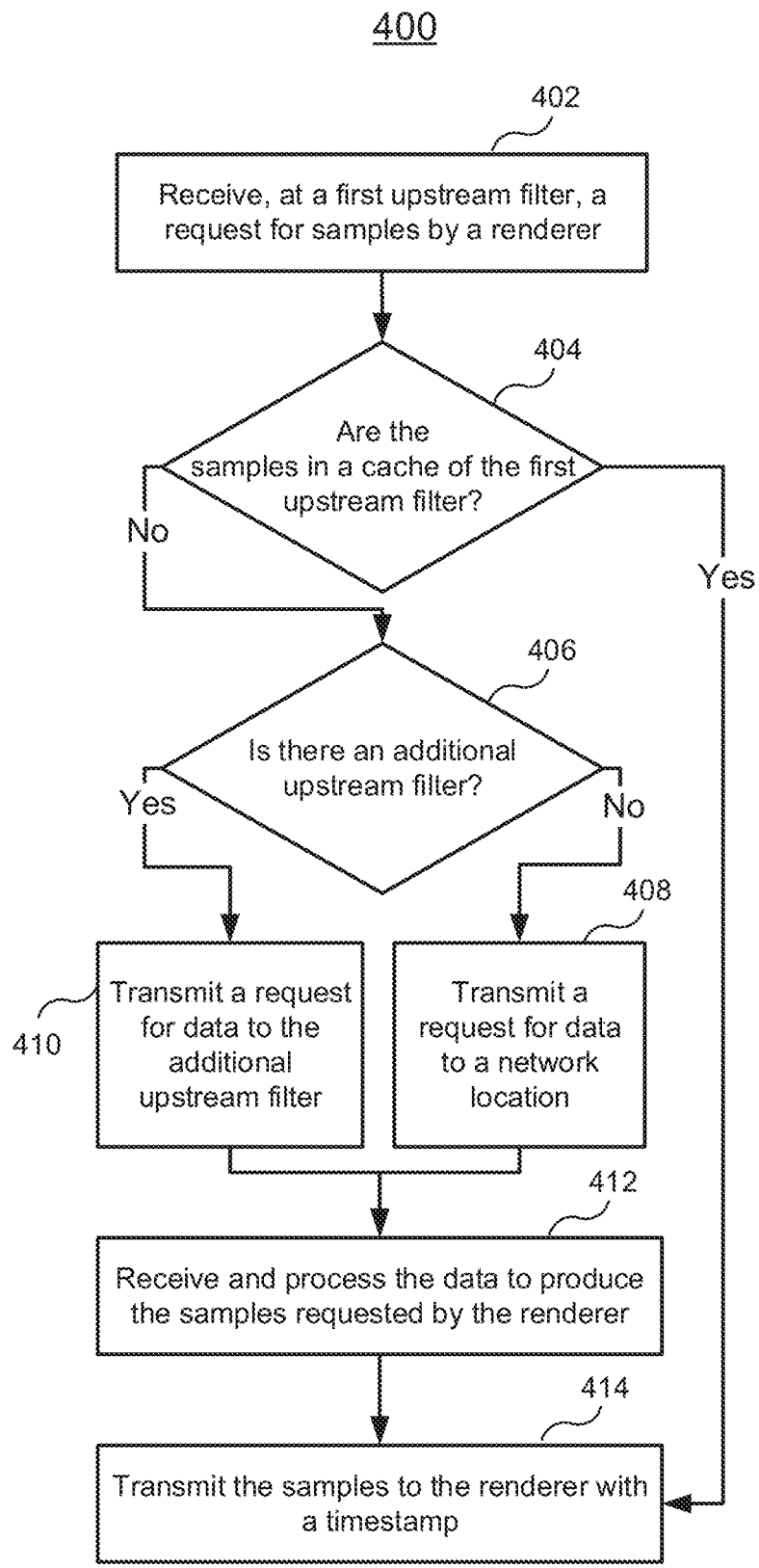
FIG. 4 illustrates a flowchart of a method for upstream communication in a constructed filter graph for in-browser media processing using web workers according to an example embodiment.

FIG. 4 illustrates a flowchart of method 400 for upstream communication in a constructed filter graph for in-browser media processing using web workers according to an example embodiment. It is noted that the exemplary method 400 shown in FIG. 4 can be implemented using the filter graph 200 shown in FIG. 2, as an example.

The renderer filters (e.g., filters 210 and 212) are responsible for issuing requests for samples to upstream filters by posting a message on the appropriate upstream MessageChannels. At 402, a first upstream filter receives a request for samples by a renderer. For example, the Video Renderer 210 may request decoded video information from the Video Decoder 206 of FIG. 2.

If the first upstream filter (e.g., Video Decoder 206) can service the request based on its cached state, the first upstream filter will do so by transmitting data back downstream to the renderer. Thus, at 404, the first upstream filter determines whether the samples are stored in a cache. If the samples are not stored in the cache, method 400 proceeds to 406, where the first upstream filter determines whether there is an additional upstream filter. In response to determining that there is, method 400 advances to 410, where the first upstream filter transmits a request for data to the additional upstream filter. This chain of requests may continue until the request for data reaches a source filter, which would then be responsible for fetching the data (e.g., from a network location, such as a video server). In method 400, if there are no additional upstream filters, then the first upstream filter is the source filter. In that case, method 400 advances to 408, where the first upstream filter transmits a request for data to a network location.

In some aspects, filters may pre-fetch additional data. For example, if a decoder filter has been asked for sample X, the decoder filter may choose to request, process, and cache sample X+1 and sample X+2 once X has been delivered. Because the decoder filter is a script running in a web worker, independent of other filters, the decoder filter is able to pre-fetch additional data without affecting the downstream filter's processing of received samples.

When a filter transmits data downstream, via a postMessage on the MessageChannel, the filter may mark the data buffer for "transfer." Transferring payloads between threads in this way avoids copying memory, by reassigning the memory reference from the sender to the receiver, with the restriction that the sender no longer has access to the memory. This restriction is not a burden in this case, since the expectation is that data "ownership" will flow downstream from filter to filter. In some cases, filters can be implemented as "in-place"—directly modifying buffers without copying memory at all.

From 408 and 410, method 400 advances to 412, where the first upstream filter receives (either from the additional upstream filter or the network location via a MessageChannel) and processes the data to produce the samples requested by the renderer.

At 414, the first upstream filter transmits the samples to the renderer in a message that also comprises a timestamp. It should be noted that a renderer may request samples from an upstream filter and the requested data may be returned asynchronously (i.e., not as a reply to the request). Returned data may thus be queued and rendered at an appropriate time as defined by timestamps and the renderers themselves. Typically clocking is the responsibility of the audio output, and the Video Renderer 210 will base its timing off this clock. Renderer filters are usually implemented directly on the main application thread, where output can be displayed to the user.

Figure 5:
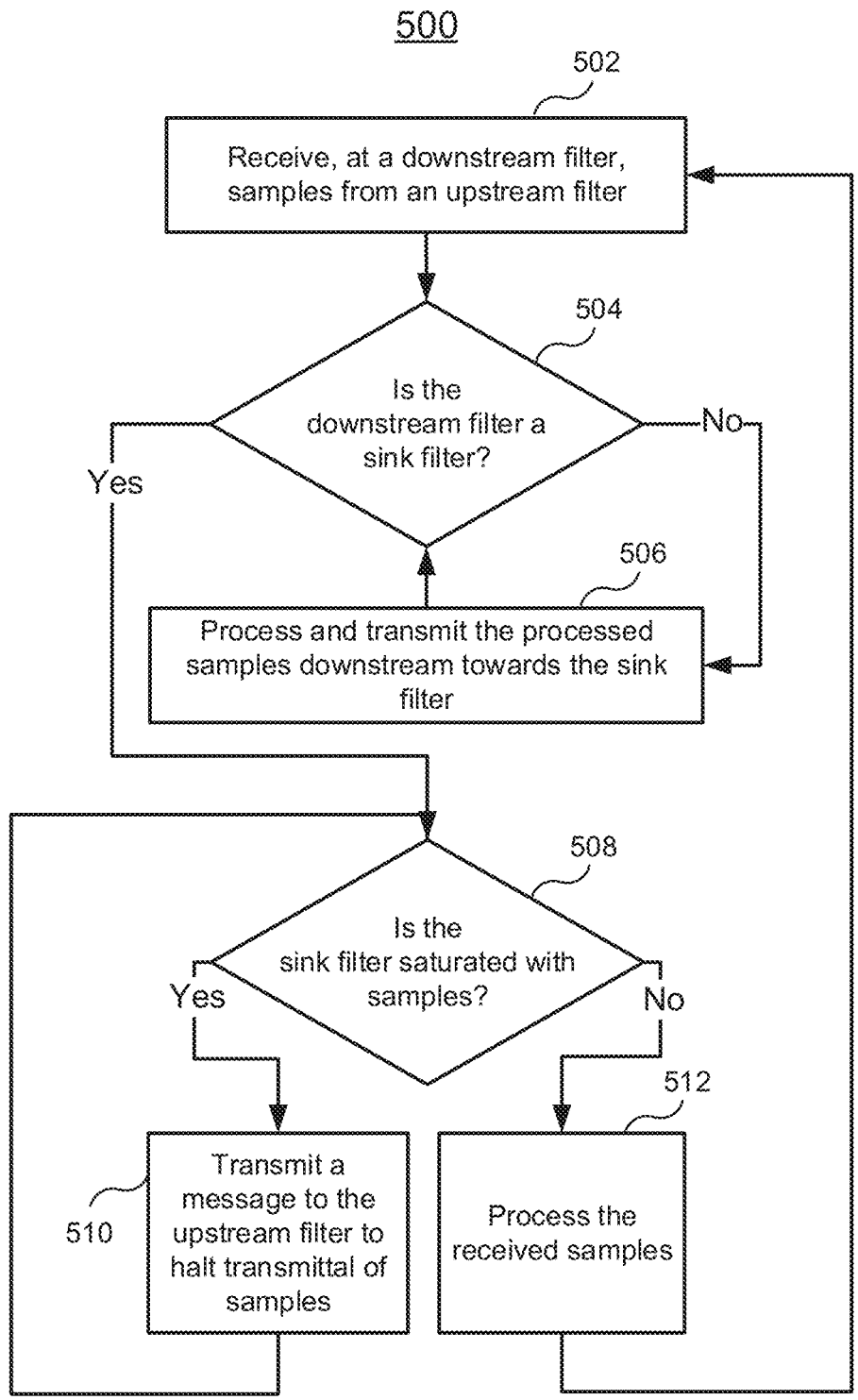
FIG. 5 illustrates a flowchart of a method for downstream communication in a constructed filter graph for in-browser media processing using web workers according to an example embodiment.

FIG. 5 illustrates a flowchart of method 500 for downstream communication in a constructed filter graph for in-browser media processing using web workers according to an example embodiment. It is noted that the exemplary method 500 shown in FIG. 5 can be implemented using the filter graph 200 shown in FIG. 2, as an example.

At 502, a downstream filter (e.g., Video Renderer 210) receives samples from an upstream filter (e.g., Video Decoder 206). At 504, the downstream filter determines whether it is a sink filter (e.g., a renderer). For example, the downstream filter can be configured to assess whether it has a MessageChannel connected to another downstream filter. If another downstream filter does not exist, then the downstream filter itself is a sink filter. In response to determining that the downstream filter is not a sink filter, method 500 proceeds to 506, where the downstream filter processes and transmits the processed samples downstream towards the sink filter. For example, if the downstream filter is Video Decoder 206, Video Decoder 206 transmits processed samples to Video Renderer 210. At that point, method 500 returns to 504, where the new downstream filter (i.e., Video Renderer 210) determines whether it is the sink filter.

In response to determining that the downstream filter is the sink filter, method 500 advances to 508, where the sink filter determines whether the sink filter is saturated with samples (i.e., whether a queue of incoming messages for the sink filter is full). In response to determining that the sink filter is not saturated, method 500 proceeds to 512, where the sink filter processes the received samples and continues to receive additional samples from upstream filters (method 500 returns to 502). In response to determining that the sink filter is saturated, method 500 proceeds to 510, where the sink filter transmits a message to the upstream filter(s) to halt transmittal of samples downstream. Periodically, or as the sink filter processes samples in its queue, method 500 may return to 508, where the sink filter assesses its own bandwidth (i.e., whether the sink filter is saturated or can accept more samples).

Figure 6:
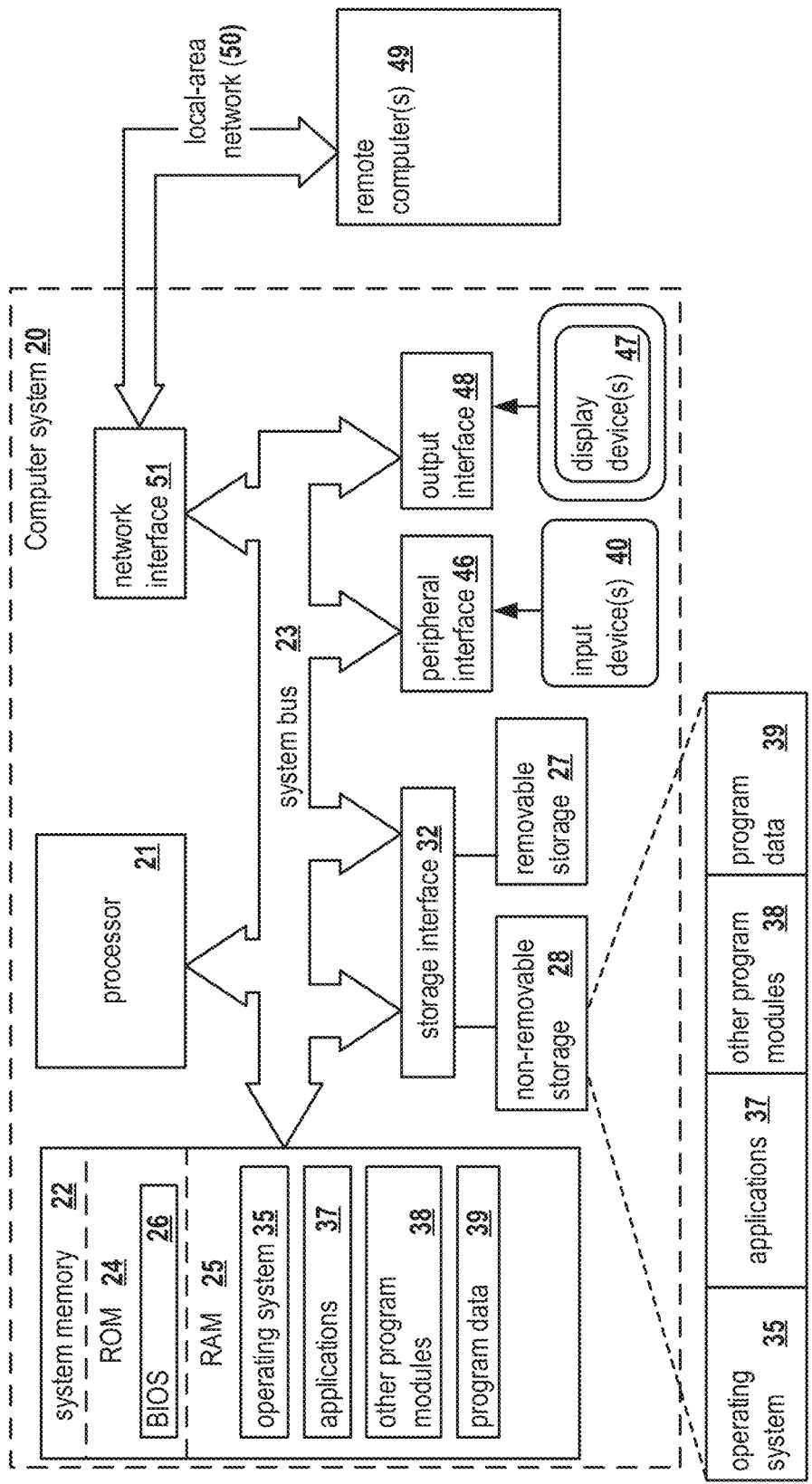
FIG. 6 is a block diagram illustrating a computer system on which aspects of the present systems and methods may be implemented in accordance with an exemplary aspect.

FIG. 6 is a block diagram illustrating a computer system 20 on which exemplary aspects of the system and method for constructing filter graph-based media processing pipelines directly in a browser can be implemented. It should be noted that the computer system 20 can execute main application thread 102 and any of the filter graphed-based web worker discussed in FIGS. 1A to 5. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof.

The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. It is noted that according to one exemplary aspect, the program application 37 can correspond to a web browser of which a filter graph, as described above, can be directly constructed therein. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

As noted above, exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the systems described in greater detail in FIGS. 1A and 1B, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for constructing filter graph-based media processing pipelines directly in a web browser, the system comprising:
 a media processing functionality determiner configured to determine a processing function of media data received by a web browser; and
 a main application thread configured to construct a filter graph directly in the web browser that includes a connected upstream filter and a renderer filter, each configured to execute a respective function for the processing function of the media data, wherein the main application thread is configured to:
  instantiate the upstream filter and the renderer filter of the filter graph as JavaScripts configured as web workers for performing the respective functions;
  assess a compatibility between the upstream filter and the renderer filter; and
  connect the upstream filter and the renderer filter via a MessageChannel if the main application thread determines that the upstream filter is compatible with the renderer filter;

wherein the upstream filter is configured to process and transmit, via the MessageChannel, media samples to the renderer filter, wherein the media samples include timestamps; and wherein the renderer filter is configured to enter the media samples in a queue and render media in the browser based on the media samples and the timestamps.

2. The system according to claim 1, wherein the processing function of media data is for converting the media data from a first format to a second format that can be rendered by the web browser.

3. The system according to claim 2, wherein the media processing functionality determiner is configured to determine that the media data is received in the first format that the web browser is not configured to render and determine the second format for the media data that can be rendered by the web browser.

4. The system according to claim 1, wherein the respective web workers are configured to be executed independently from the main application thread.

5. The system according to claim 1, wherein the main application thread is configured to execute the media processing functionality determiner to determine the processing function of media data and to instantiate the upstream filter and the renderer filter of the filter graph based on the determined processing function.

6. The system according to claim 1, wherein the main application thread is configured to assess the compatibility between the upstream filter and the renderer filter based on input and output pins of the respective filters and the configurations of the pins for communicating data based on at least one of a data type and a data format of the communicated data between the respective filters.

7. A system for constructing filter graph-based media processing pipelines directly in a web browser, the system comprising:

a media processing functionality determiner configured to determine a processing function of media data received by a web browser; and a main application thread configured to construct a filter graph directly in the web browser that includes a first filter and a second filter that are each configured to execute a respective function for the processing function of the media data, wherein the main application thread is configured to:

instantiate the first and second filters of the filter graph as web workers for performing the respective functions;

assess a compatibility between the first and second filters; and connect the first filter and the second filter via a message channel if the main application thread determines that the respective filters are compatible with each other;

wherein the first filter is configured to process and transmit media to the second filter; and wherein the second filter is configured to enter the media in a queue and render media content in the browser based on the queued media.

8. The system according to claim 7, wherein the first filter comprises a connected upstream filter and the second filter comprises a renderer filter that is configured to render the media.

9. The system according to claim 7, wherein the processing function of media data is for converting the media data from a first format to a second format that can be rendered by the web browser.

10. The system according to claim 9, wherein the media processing functionality determiner is configured to determine that the media data is received in the first format that the web browser is not configured to render and determine the second format for the media data that can be rendered by the web browser.

11. The system according to claim 7, wherein the respective web workers are configured to be executed independently from the main application thread.

12. The system according to claim 7, wherein the main application thread is configured to execute the media processing functionality determiner to determine the processing function of media data and to instantiate the first and second filters of the filter graph based on the determined processing function.

13. The system according to claim 7, wherein the main application thread is configured to assess the compatibility between the respective filters based on input and output pins of the respective filters and the configurations of the pins for communicating data based on at least one of a data type and a data format of the communicated data between the respective filters.

14. A system for constructing filter graph-based media processing pipelines to render media content, the system comprising:

a web browser running on a client device and configured to render media content; and a main application thread executed by a processor of the client device, such that the main application thread is configured to:

determine a processing function of media data received by the web browser;

construct a filter graph directly in the web browser that includes a first filter and a second filter that are instantiated as web workers and are each configured to execute a respective function for the processing function of the media data;

assess a compatibility between the first and second filters; and connect the first filter and the second filter via a message channel if the main application thread determines that the respective filters are compatible with each other, wherein the first filter is further configured to process and transmit media to the second filter after performing the respective function and the second filter enters the transmitted media in a queue and renders media content in the browser based on the queued media.

15. The system according to claim 14, wherein the first filter comprises a connected upstream filter and the second filter comprises a renderer filter that is configured to render the media.

16. The system according to claim 14, wherein the processing function of media data is for converting the media data from a first format to a second format that can be rendered by the web browser.

17. The system according to claim 16, wherein the main application thread is further configured to determine that the media data is received in the first format that cannot be rendered by the web browser and determine the second format for the media data that can be rendered by the web browser.

18. The system according to claim 14, wherein the respective web workers are configured to be executed independently from the main application thread.

19. The system according to claim 14, wherein the main application thread is configured to determine the processing function of media data and to instantiate the first and second filters of the filter graph based on the determined processing function.

20. The system according to claim 14, wherein the main application thread is configured to assess the compatibility between the respective filters based on input and output pins of the respective filters and the configurations of the pins for communicating data based on at least one of a data type and a data format of the communicated data between the respective filters.

* * * * *